United States Patent [19]

Newman

[11] Patent Number: 5,397,549
[45] Date of Patent: Mar. 14, 1995

[54] APPARATUS TO REMOVE ACID GASES FROM A FLUE GAS

[76] Inventor: Dave B. Newman, 5th Fl., 796 Granville Street, Vancouver, British Columbia, Canada, V6Z 1K1

[21] Appl. No.: 76,944

[22] Filed: Jun. 16, 1993

Related U.S. Application Data

[63] Continuation-in-part of Ser. No. 797,835, Nov. 26, 1991, abandoned.

[51] Int. Cl.[6] .................. B01D 50/00; C01B 17/00
[52] U.S. Cl. .................. 423/235; 422/171; 422/177; 422/262; 422/173; 55/233; 55/267; 423/242.1; 423/243.03; 423/243.01; 261/DIG. 74
[58] Field of Search ............... 422/171, 173, 177, 262, 422/267, 178; 55/233, 267; 261/DIG. 74; 423/242 R

[56] References Cited

U.S. PATENT DOCUMENTS

| | | | |
|---|---|---|---|
| 1,947,777 | 2/1934 | Huff et al. | 261/94 |
| 3,754,074 | 8/1973 | Grantham | 423/210 |
| 3,907,970 | 9/1975 | Boening | 423/242 |
| 4,123,507 | 10/1978 | Hass | 423/574 R |
| 4,320,101 | 3/1982 | Trentham et al. | 423/243 |
| 4,335,076 | 6/1982 | McFarland | 422/171 |
| 4,481,155 | 11/1984 | Frohwerk | 261/94 |
| 4,497,753 | 2/1985 | Streiff | 261/95 |
| 4,670,196 | 6/1987 | Hsia | 261/112 |
| 4,713,234 | 12/1987 | Weirich et al. | 423/648 R |
| 5,094,826 | 3/1992 | Paikert et al. | 423/242 |

Primary Examiner—Robert J. Warden
Assistant Examiner—Christopher Y. Kim

[57] ABSTRACT

A method and apparatus to remove acid gases from a flue gas containing sulphur dioxide and oxides of nitrogen. There is a heat exchanger to reduce incoming flue gas temperatures. Gas from the heat exchanger are oxidized to their higher oxidation state. A reaction tower receives the oxidized gases. The reaction tower includes a reaction surface. There is a first inlet for gases adjacent the base of the reaction tower and a second inlet for a basic compound in the reaction tower above the first inlet. The arrangement allows counter current flows of the gas and the basic compound to enable scrubbing of the gas. There is an outlet for scrubbed gas and an outlet for liquids at the tower base.

12 Claims, 2 Drawing Sheets 5,397,549

APPARATUS TO REMOVE ACID GASES FROM A FLUE GAS

This application is a continuation-in-part of U.S. application Ser. No. 797,835, filed Nov. 26, 1991, abandoned the subject matter of which is incorporated herein by reference.

FIELD OF THE INVENTION

This invention relates to an apparatus and method to remove acid gases from a flue gas containing sulphur dioxide and oxides of nitrogen.

DESCRIPTION OF THE PRIOR ART

Acid rain is now considered a problem throughout the world. In the north eastern United States, in eastern Canada, particularly southern Ontario, and in Western Europe acid rain affects the environment by reducing air quality, rendering lakes acid and killing vegetation, particularly trees.

In the main, acid rain stems from sulphur dioxide production in smoke stacks. Sulphur dioxide is subsequently oxidized in the atmosphere to sulphur trioxide and sulphuric acid is formed. The oxides of nitrogen also are a factor in producing nitric acid in the atmosphere but this problem is less pronounced than the production of sulphuric acid.

There have been large numbers of suggestions to curb acid rain. In general, international agreements are required because smoke stacks put gases into the atmosphere at considerable heights and the acid gases are then moved in the atmosphere over considerable distances. For example, Canada has long complained to the United States concerning acid rain and in Europe, Britain is blamed by several Scandinavian countries for acid rain in those countries.

No effective solution is yet widely available and there is clearly a demand for a solution to this major problem.

SUMMARY OF THE INVENTION

The present invention provides an apparatus and method that are simple to operate and use relatively simple chemical reactions to curb acidity at the point of production, that is prior to emission of the exhaust gases into the atmosphere through smoke stacks.

Accordingly, in a first aspect, the invention is an apparatus to remove acid gases from a flue gas containing sulphur dioxide and oxides of nitrogen, the apparatus consisting essentially of, in sequence; a heat exchanger to reduce flue gas temperatures; an oxidation chamber to receive gases from the heat exchanger and to oxidize the oxides of sulphur and nitrogen in the flue gases to their highest valency states, said oxidation chamber comprising a plurality of corrugated sheets to increase internal surface area; a reaction tower to receive gases from the oxidizing chamber; a first pump prior to the oxidation chamber and a second pump prior to the reaction tower to assist gas flow in the apparatus; means within the reaction tower to define a reaction surface; said reaction tower including a first inlet for gas adjacent its base; a second inlet for a basic compound in the reaction tower, above the first inlet, to allow counter current flow of the gas and the basic compound to scrub the gas; an outlet for scrubbed gases; the reaction tower including a conduit extending from the top of the reaction tower to the outlet for scrubbed gases, adjacent the tower base, whereby gas passes up the tower to be scrubbed then down the conduit to the outlet for scrubbed gases; the second inlet being a pipe surrounding the conduit; a third inlet surrounding the conduit to allow introduction of an oxidizing compound to ensure complete oxidation of gases in the tower; a pipe to recycle gas from the base of the tower to a fourth inlet in the tower whereby a second scrubbing of the gas may be carried out; means to cool the recycled gas in the pipe; and an outlet for liquids at the tower base; the outlet for liquids communicating with a liquid/solid separator to separate solution and slurry solids.

In a further aspect, the invention is a method of removing an acid gas from a flue gas containing a sulphur dioxide and oxides of nitrogen, the method comprising, reducing the flue gas temperature in a heat exchanger to a temperature of about 65° C.; oxidizing the gas from the heat exchanger in an oxidation chamber containing a plurality of corrugated sheets to increase the internal surface area, the gas being oxidized in the oxidation chamber so that the oxides of sulphur and nitrogen are in their highest valency states; conducting the gas from the oxidation chamber to a reaction tower and introducing the gas into the reaction tower through a first inlet, adjacent the base of the reaction tower; introducing a solution of a basic compound into the reaction tower through a second inlet, above the first inlet, and allowing the solution of the basic compound to flow countercurrent to the gas to neutralize the acid components in the gas to produce a neutralized gas; directing the neutralized gas into a conduit extending from the top of the reaction tower to an outlet for neutralized gas adjacent the base of the tower whereby gas passes up the tower, acid compounds are neutralized by a counter-current flow of the basic compound, then pass down the conduit to the outlet; collecting a suspension comprising a solution of neutral, soluble salts and neutral insoluble salts, at the base of the reaction tower; and separating the solids from the liquid in a liquid/solid separator.

In yet a further aspect, the invention is a method of removing acid gases from a flue gas containing sulphur dioxide and oxides of nitrogen, the methods comprising, reducing the flue gas temperature in a heat exchanger to a temperature in the range of about 65° C.; sparging the gas from the heat exchanger into the base of a reaction tower; introducing into the reaction tower an aqueous solution of a basic calcium compound; introducing into the reaction tower an aqueous solution of hydrogen peroxide to oxides the oxide of sulphur and nitrogen to their highest valency state; whereby the oxides oxide of sulphur and nitrogen react with a basic calcium compound to produce neutral, insoluble calcium sulphate dihydrate and neutral soluble calcium nitrate as an aqueous suspension; collecting said suspension and separating the solid dihydrate of calcium sulphate from the aqueous solution of calcium nitrate in a liquid/solids separator.

DESCRIPTION OF THE PREFERRED EMBODIMENTS

Figure 1:
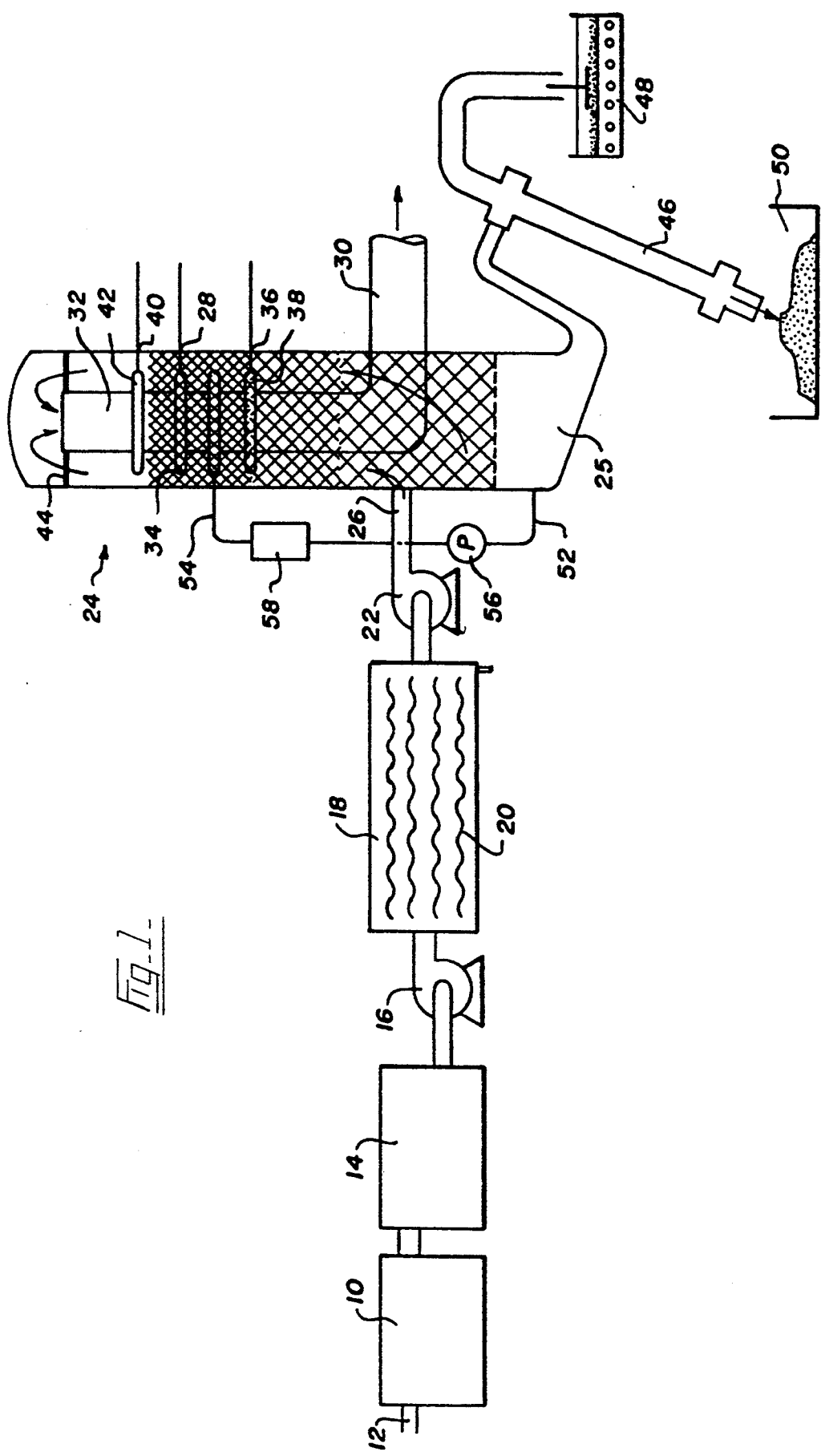
FIG. 1 is diagram of an apparatus according to one embodiment of the present invention.

FIG. 1 shows, diagrammatically, a filter house 10 containing conventional filter bags (not shown) in which solids are removed from an exhaust gas which enters through inlet 12. The gas is then fed through a heat exchanger 14 where heat is extracted. Typically the temperature reduction is from about 250° C. to about 65° C.

The gas is then pumped by blower 16 to an oxidation chamber 18 where the sulphur oxides and nitrogen oxides in the gas are oxidized to their highest valency state. For example, the predominant oxide of sulphur in the exhaust gas will be sulphur dioxide but sulphur trioxide is a much more reactive gas and in oxidation chamber 18 the sulphur dioxide will be oxidized to sulphur trioxide.

Typically the oxidizing chamber will include a plurality of corrugated sheets 20 to increase the internal surface area and providing mixing of the reactants. The sheets may be of stainless steel or of lead. In any event a oxidation of the oxides of nitrogen and sulphur, particularly the latter, to the highest valency state takes place.

Gases from the oxidation chamber 18 are pumped by pump 22 to a reaction tower 24 where they may be reacted to substantially eliminate the environmentally unacceptable compounds.

The reaction tower 24 has base 25 and a first inlet 26 for gas adjacent base 25. There are means within the reaction tower 24 to define a reaction surface. For example, the reaction tower 24 may be packed with tile or with Raschig rings or, indeed, any chemically inert material that increases surface area and thus the area at which reactions can take place. The reaction tower 24 includes a second inlet 28 for a basic compound, above the first inlet 26. This allows a basic compound to flow counter-current to the gas flow and the basic compound therefore scrubs the gas by reacting with the acidic compounds in the gas to produce neutral salts. In a particularly preferred embodiment the sprayed compound is calcium hydroxide which produces calcium nitrate by reaction with the oxides of nitrogen and calcium sulphate dihydrate by reaction with sulphuric acid produced from sulphur trioxide. Both these compounds are chemically neutral and, in particular, are of value, as a fertilizer in the case of calcium nitrate and as a means of producing wall board in the case of calcium sulphate dihydrate, also known as gypsum.

There is an outlet 30 for scrubbed gases. In the illustrated embodiment the reaction tower 24 includes a conduit 32 extending from the top of the reactor tower to the second outlet 30, adjacent the tower base. Gases pass up the tower 24 to be scrubbed then down the conduit 32 to the outlet 30. In this arrangement the basic compound, for example calcium hydroxide, is dripped through an inlet pipe 34 surrounding the conduit 32 and receiving the basic compound from inlet 28.

In the illustrated embodiment an inlet 36 for an oxidizing compound is shown. The inlet 36 feeds to an annulus 38 surrounding the conduit 32. The oxidizing compound ensures complete oxidation of gases that may not have been oxidized completely in the oxidation chamber 18. In a preferred embodiment a solution of hydrogen peroxide may be used.

There is a further inlet 40, above the inlet 28 for the basic Compound, where additional basic compound may be fed to annulus 42, if required.

There is a mist eliminator 44 within the tower. In the illustrated embodiment the mist eliminator 42 is a disc surrounding the upper end of the conduit 32 and housing a large number of perforations. It is desirable to avoid mist production in the process. Mist is an environmental hazard in reducing air quality.

The base 25 of the reaction tower 24 receives the reaction products produced in the tower and communicates with a liquid/solid separator 46 that separates the solution and slurry solids. The solution, a solution of calcium nitrate in the preferred embodiment, is fed to a tank 48 and the solids, typically insoluble calcium sulphate dihydrate, are fed to a vessel 50.

The illustrated embodiment includes pipe 52 to recycle gas from the base 25 of the tower 24 to an inlet 54 in the tower to ensure that complete scrubbing of the gas may be carried out. The pipe 52 includes a pump 56 and also a heat exchanger 58 to cool the recycled gas. The extraction of heat from industrial processes is desirable. It may facilitate the reaction, but it also is a useful source of heat that otherwise would be wasted by being fed to the atmosphere. Inlet 54 communicates with an annulus 58 through which recycled gas is fed back into tower 24.

The apparatus may be extensively monitored. It is envisaged that the calcium nitrate may be used directly as a fertilizer and sold to the public in the form in which it is received in the tank 48. To this end, it is desirable to constantly monitor the specific gravity of the calcium nitrate solution. The pH of the process should be monitored to ensure proper gypsum production. Gypsum is a major component in the production of wall board and cement and, at present, large amounts of gypsum are imported into the United States and Canada from Mexico.

The necessity to add hydrogen peroxide may be determined by testing the oxidation potential of the contents of the reaction chamber 24. For example if nitrite is present then contact with potassium permanganate solution will show the presence of nitrite by discoloration of the potassium permanganate solution. In those circumstances, hydrogen peroxide, or additional hydrogen peroxide, can be fed through annulus 38.

Figure 2:
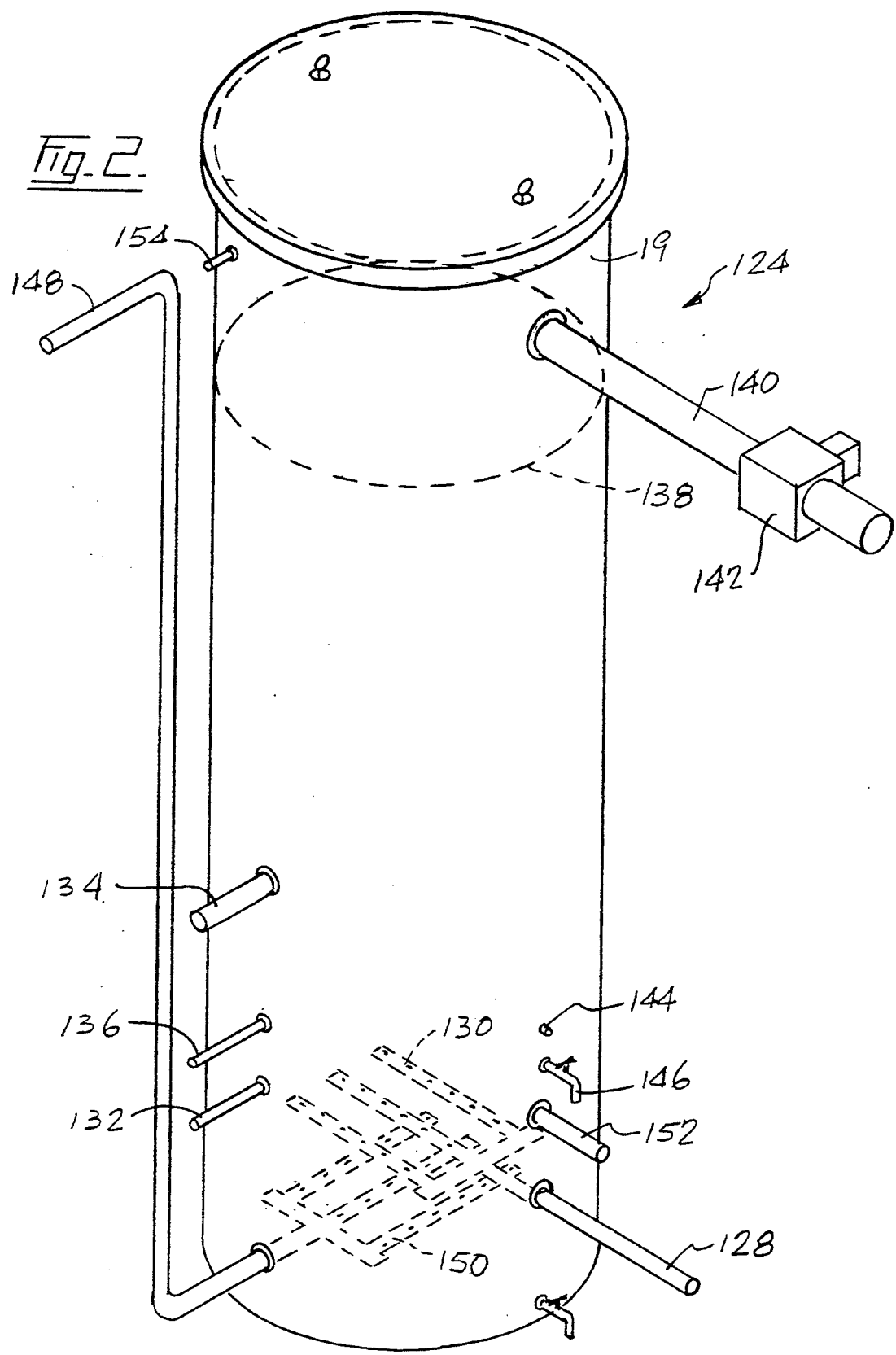
FIG. 2 illustrates a further apparatus useful in the method of the present invention.

FIG. 2 illustrates a variation of the apparatus of FIG. 1. In FIG. 2 only a reaction tower 124 is shown. For the rest, the apparatus is as shown in FIG. 1 except pump 16 and the oxidation chamber 18 are not necessary with the apparatus as shown in FIG. 2. However, the inlet 12, filter house 10 containing conventional filter bags, for example of polytetrafluoroethylene and the heat exchanger 14 are retained. Pump 22 is also preferably retained.

In the apparatus of FIG. 2 the function of the oxidation chamber 18 and the reaction tower 24 of FIG. 1 are combined.

Gas from the heat exchanger 14 enters the tower 124 through an inlet 128 to a series of jets 130 through which the gas can be sparged upwardly. There is an inlet 132 for hydrogen peroxide and an inlet 134 for a basic calcium compound. A further inlet 136 may be used to introduce an anti-foaming compound, for example, a silicone.

The liquid level is shown at 138. The reactor 124 is generally operated 80% full, that is there is a 20% gas space 138 at the top of the reactor 124. Gas from this space 138 is passed through outlet 140 by a pump 142 and neutral gas may be vented through outlet 140 to a stack (not shown).

There is an outlet 144 connected to a pH meter which allows metering of the pH level which should be maintained on the acid side of neutral, typically at about 4.5 to 5.5 in order to drive off $CO_2$. There is a conventional drain 146 so that analysis of the contents of the reactor 124 may be carried. There is, in addition, an air inlet 148. The air inlet 148 connects with jets 150 so that air may be sparged through the reaction mixture. The air reduces the amount of hydrogen peroxide needed by assisting in the oxidation of the oxides of nitrogen and acts to agitate the reaction mixture.

An outlet 152 is for product of the reactor.

In use of the apparatus shown in FIG. 2, the flue gas, cooled to about 20° C. by the heat exchanger 14 and cleaned in the filter house 10 is sparged to the bottom of the reaction tower 124 through jets 130. Atmospheric air is also sparged into the bottom of the tank 124 through jets 150. Prior to starting the gas flow, water is introduced in the tower through the inlet 134. The flue gas and the air are then bubbled through the water and a 3% solution of hydrogen peroxide is also fed in through inlet 132. The pH is measured. When the pH is in the range of 4.5 to 5.5 a 30% slurry of calcium hydroxide may be pumped in through inlet 134. The flow of hydrogen peroxide is regulated in response to a signal received from a hydrogen peroxide detector 154 in the space above the liquid. Maintaining the pH in this range ensures that carbon dioxide is given off.

The calcium hydroxide slurry is continuously pumped in and the rate of flow of gas is maintained, to keep the pH in the range 4.5 to 5.5. A slurry forms in the tank 124 comprising gypsum, or insoluble calcium sulphate dihydrate, and calcium nitrate, which is, of course, water soluble. These are produced because sulphur dioxide is constantly oxidised to sulphur trioxide which forms sulphuric acid in the aqueous solution to react with the calcium hydroxide to form calcium sulphate dihydrate. Similarly, the oxides of nitrogen are oxidised to nitrogen pentoxide which reacts with the water to form nitric acid which reacts with the calcium hydroxide to form calcium nitrate.

The suspension of calcium sulphate dihydrate and calcium nitrate is taken through the outlet 152 and separated, as in FIG. 1, into solid calcium sulphate dihydrate and an aqueous solution of calcium nitrate.

Withdrawal of the suspension takes place when the liquid level reaches approximately 80% of the volume of the tower 124. At this point final adjustments are made and the process should then only require slight adjustment for continuous operation.

The calcium sulphate dihydrate withdrawn can be used in the manufacture of cement. Calcium carbonate coprecipitated with the gypsum is a desirable component in cement.

The calcium nitrate solution can be used directly as a fertilizer. Dilution or concentration, as required, can obviously be carried out with ease.

The present invention thus provides an apparatus that can be added to existing plants at relatively minor cost. The apparatus is effective in removing the vast majority of acidic compounds from exhaust gases, which is in itself desirable, but the process has the additional advantage of producing industrially or environmentally useful compounds. Calcium nitrate is a valuable fertilizer; of calcium sulphate dihydrate is a valuable industrial compound.

Although the forgoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. Apparatus to remove acid gases from a flue gas containing sulphur dioxide and oxides of nitrogen, the apparatus consisting essentially of, in sequence;
   a heat exchanger to reduce flue gas temperatures;
   an oxidation chamber to receive gases from the heat exchanger and to oxidize the oxides of sulphur and nitrogen in the flue gases to the highest valency state, said oxidation chamber comprising a plurality of corrugated sheets to increase internal surface area;
   a reaction tower to receive gases from the oxidizing chamber;
   a first pump prior to the oxidation chamber and a second pump prior to the reaction tower to assist gas flow in the apparatus;
   means within the reaction tower to define a reaction surface;
   said reaction tower including a first inlet for gas adjacent its base;
   a second inlet for a basic compound in the reaction tower, above the first inlet, to allow counter current flow of the gas and the basic compound to scrub the gas;
   an outlet for scrubbed gases;
   the reaction tower including a conduit extending from the top of the reaction tower to the outlet for scrubbed gases, adjacent the tower base, whereby gas passes up the tower to be scrubbed then down the conduit to the outlet for scrubbed gases;
   the second inlet being a pipe surrounding the conduit;
   a third inlet surrounding the conduit to allow introduction of an oxidizing compound to ensure complete oxidation of gases in the tower;
   a pipe to recycle gas from the base of the tower to a fourth inlet in the tower whereby a second scrubbing of the gas may be carried out;
   means to cool the recycled gas in the pipe; and an outlet for liquids at the tower base;
   the outlet for liquids communicating with a liquid/solid separator to separate solution and slurry solids.

2. Apparatus as claimed in claim 1 including a pump in the pipe to the fourth inlet to facilitate flow of the recycled gas.

3. A method of removing an acid gas from a flue gas containing a sulphur dioxide and oxides of nitrogen, the method comprising:
   reducing the flue gas temperature in a heat exchanger to a temperature of about 65° C.;
   oxidizing the gas from the heat exchanger in an oxidation chamber containing a plurality of corrugated sheets to increase the internal surface area, the gas being oxidized in the oxidation chamber so that the oxides of sulphur and nitrogen are in their highest valiancy states;
   conducting the gas from the oxidation chamber to a reaction tower and introducing the gas into the reaction tower through a first inlet, adjacent the base of the reaction tower;
   introducing a solution of a basic compound into the reaction tower through a second inlet, above the first inlet, and allowing the solution of the basic compound to flow counter-current to the gas to neutralize the acid components in the gas to produce a neutralized gas;

directing the neutralized gas into a conduit extending from the top of the reaction tower to an outlet for neutralized gas adjacent the base of the tower whereby gas passes up the tower, acid compounds are neutralized by a counter-current flow of the basic compound, then pass down the conduit to the outlet;

collecting a suspension comprising a solution of neutral, soluble salts and neutral insoluble salts, at the base of the reaction tower; and separating the solids from the liquid in a liquid/solid separator.

4. A method as claimed in claim 3 in which the basic compound comprises calcium hydroxide.

5. A method as claimed in claim 4 in which the calcium hydroxide is dripped or sprayed through a second inlet that surrounds the conduit.

6. A method as claimed in claim 3 including introducing an oxidizing compound into the reaction tower to ensure complete oxidation of gas in the tower.

7. A method as claimed in claim 3 including recycling the gas from the base of the tower to an inlet in the tower whereby a second scrubbing of the gas is carried out.

8. A method as claimed in claim 7 including cooling the recycled gas being recycled from the base of the tower to said inlet.

9. A method as claimed in claim 3 in which the reaction tower is filled to about 80% of its volume with liquid.

10. A method as claimed in claim 9 including recycling the gas above the liquid by a pump on an outlet pipe communicating with the space above the liquid and back into the reaction tower.

11. A method as claimed in claim 3 including sparging air into the reaction tower to assist agitation and oxidation and thus reduce hydrogen peroxide demand.

12. A method as claimed in claim 3 including measuring the pH of the solution and adding calcium hydroxide as a result of the pH measurement to maintain the pH in the range 4.5 to 5.5.

* * * * *